UNITED STATES PATENT OFFICE.

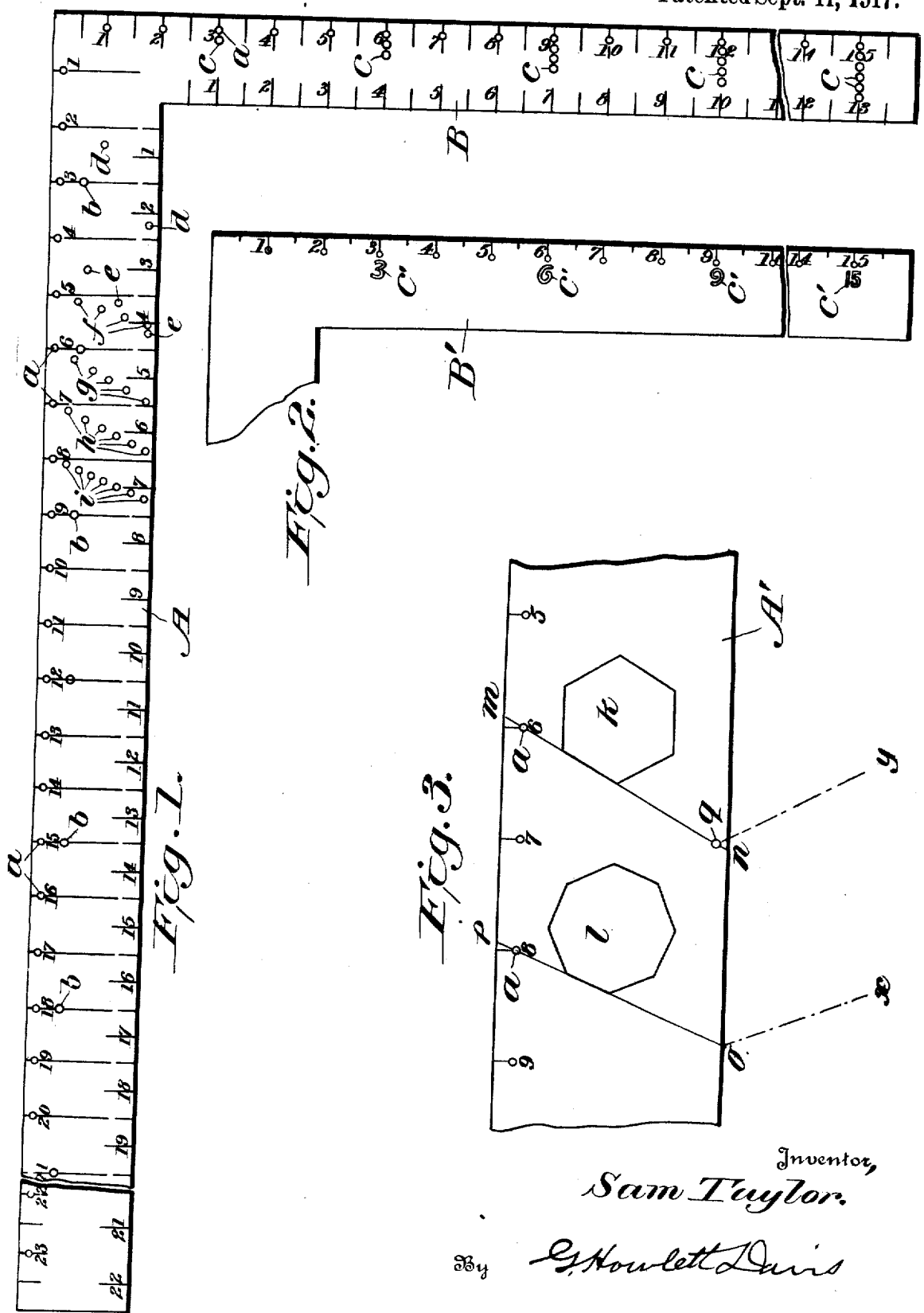

SAM TAYLOR, OF MORGANTOWN, NORTH CAROLINA.

CARPENTER'S SQUARE.

1,239,742. Specification of Letters Patent. Patented Sept. 11, 1917.

Application filed May 16, 1916. Serial No. 97,973.

*To all whom it may concern:*

Be it known that I, SAM TAYLOR, a citizen of the United States, residing at Morgantown, in the county of Burke and State of North Carolina, have invented certain new and useful Improvements in Carpenters' Squares, of which the following is a specification.

This invention relates to measuring instruments in the nature of carpenters' squares or rules. One object of the invention is to provide such instruments with means whereby certain of the scale divisions can be readily distinguished from others at a glance, or even in a poor light by the sense of touch, thus avoiding confusion and mistakes. Another object is to provide an instrument of this character with means by which the proper angle for constructing any of the more common polygons can be easily and quickly laid off.

With the above objects in view, the invention consists in the construction and arrangement hereinafter described and claimed, and illustrated in the accompanying drawings, in which;

Figure 1 is a view of an ordinary steel square with my improvements applied thereto, parts being broken away;

Fig. 2 is a view similar to Fig. 1, showing the blade of the square, and illustrating a slightly modified arrangement; and, Fig. 3 is an enlarged fragmentary view of a portion of the body of a square showing a still further modified arrangement.

In the drawings, many of the fractional subdivisions of the scale have been omitted for the sake of clearness. Referring to Fig. 1, it will be noted that I prefer to distinguish the even inch scale divisions from the fractional divisions by forming a small hole $a$ adjacent the edge of the square. This feature may be applied to both the body A and the blade B of the square, as shown in Fig. 1.

In order that every third inch may be readily and unmistakably distinguished, I may provide a single larger hole at each third inch, marked as indicated at $b$, at the 3, 6, 9, 12, etc. inch marks as shown on the body of the square in said figure. While I have shown a single hole $b$, it will, of course, be understood that two or more such holes can be employed if desired.

A preferred arrangement, however, for indicating multiple inch scale divisions, such, for example, as every third inch, with unmistakable accuracy, is shown in the blade portion of the square illustrated in Fig. 1. Referring to this figure, it will be seen that at the scale division 3, I provide one larger hole $c$ in addition to the small hole $a$; at the 6 inch division I provide two such holes $c$; at the 9 inch division, three such holes, etc., thus indicating by the number of holes the number of inch group units from the corner of the square. Thus, for the fifth group of three inches each, or fifteen inches, I provide five holes. In this arrangement, the small holes $a$ may be omitted and the inch marks distinguished by the larger holes, if desired.

In Fig. 2, I have shown still a third method of distinguishing inch groups by characteristic marks. In this figure I have shown how this can be done by punching the figures, such as 3, 6, 9, etc. into or through the metal of the blade B', as by means of a die. In any of the methods illustrated, it will be seen that it is impossible for the distinguishing or characteristic marks separating the inch groups to become obliterated by wear or usage, and such marks are always readily distinguishable even under the most adverse conditions.

Another feature of my invention consists in providing means on the square to indicate the angles of the more common polygons. One way of doing this is illustrated in Fig. 1, and consists in forming an oblique row of holes in the body of the square. I prefer to indicate the number of sides of the polygon by the number of holes appearing in each row. Thus, for a triangle, I use three holes, as indicated at $d$; for a pentagon, I employ five holes, as shown at $f$; for a hexagon, six holes $g$, etc. I also provide a row of four holes $e$, disposed at an angle of 45°, thus making the diagonal of a square or a true miter.

In order to still further distinguish the various angles, and as an additional means of indicating the number of sides of the polygons to which they correspond, I place each row of holes adjacent its corresponding number on the scale. Thus, the row of six holes, indicating the angle of a hexagon, extends from the figure 6; the row of seven holes $h$, indicating the angle of a heptagon, extends from the figure 7; the row of eight holes $i$, indicating the angle of an octagon, extends from the figure 8, and so on, indefinitely. The only exception to this is in the case of the triangle, the three holes $d$ of which preferably extend from the figure 1, in order to avoid conflict with the other rows of holes.

In Fig. 3, I have illustrated still another method by which the angles of the various polygons may be indicated and distinguished. In this arrangement, I preferably form on the body A' of the square, as by stamping, outlines of the various polygons, and extend one side of each across the width of the square to form the proper angle with the edge of the square. Thus, in Fig. 3, I have shown a hexagon at $k$, and an octagon at $l$. One side of the hexagon is extended to form the line $m$—$n$, and one side of the octagon is extended to form the line $p$—$o$. One terminal of these lines may be marked by the usual small hole $a$ at one side, and a small hole $q$ adjacent the opposite edge of the square, or the hole such as $q$ may be omitted and the line simply extended to the edge of the square, as indicated at $o$.

It will be understood that the angles formed by the lines, such as $o$—$p$ and $m$—$n$, with the edge of the square, are in reality equal to one-half of the corresponding angles of the respective polygons. This applies also to the rows of holes $d, e, f, g, h, i$, above described. For example, to lay off the proper angle for an octagon, the points $o$ and $a$, or $o$ and $p$, will be marked on the work and the square then reversed, so that the line $o$—$a$ or $o$—$p$ will take up the direction $o$—$x$. The angle $a$—$o$—$x$ is then the proper angle for an octagon. In the same way, the angle $a$—$q$—$y$ is the proper angle for a hexagon, etc. Where the rows of holes are employed, as in Fig. 1, the two sides of the angle may be readily laid off by marking the work with a pencil point through the end holes, and then rolling the square over on its edge so as to bring the other face into contact with the work, and marking through the end hole in this new position. It is thought that the method of using the square and laying off these angles will be apparent without further discussion.

What I claim is:

1. In a device of the character described, a flat blade or the like having a scale, and provided with a series of groups of perforations located at certain scale divisions thereof, the number of perforations in each group increasing progressively from one end of the scale to the other.

2. In a device of the class described, an instrument provided with a straight edge and a scale, said instrument having means associated with each unit scale division thereof for defining, in conjunction with said straight edge, an angle bearing a definite simple relation to the angle of a regular polygon, the number of sides of the polygon being indicated by the position of the particular division in the scale.

3. A measuring instrument comprising a flat portion having a pair of straight, parallel edges and provided with a row of perforations extending across the same, said row of perforations being disposed at such an inclination to said edges as to form therewith an angle equal to one half the angle of a regular polygon.

4. A measuring instrument having a straight edge, and provided with a plurality of rows of perforations extending across the same and each forming with the straight edge an angle bearing a definite relation to that of a regular polygon, the number of perforations in each row corresponding to the number of sides of the polygon.

In testimony whereof I have affixed my signature.

SAM TAYLOR.